(12) United States Patent
Shukla et al.

(10) Patent No.: US 12,032,590 B1
(45) Date of Patent: Jul. 9, 2024

(54) MACHINE LEARNING TECHNIQUES FOR NORMALIZATION OF UNSTRUCTURED DATA INTO STRUCTURED DATA

(71) Applicant: Optum, Inc., Minnetonka, MN (US)

(72) Inventors: Abhay Shukla, Noida (IN); Sarosh S Shetty, Fairfax, VA (US); Swadeep Singh, Noida (IN); John A Hancock, Rockville, MD (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/090,098

(22) Filed: Dec. 28, 2022

(51) Int. Cl.
*G06F 16/25* (2019.01)
*G06F 16/28* (2019.01)
*G06F 18/2413* (2023.01)

(52) U.S. Cl.
CPC .......... *G06F 16/258* (2019.01); *G06F 16/285* (2019.01); *G06F 18/2413* (2023.01)

(58) Field of Classification Search
CPC .......... G06N 20/00; G06N 20/20; G06N 7/01; G06N 3/08; G06F 16/258; G06F 16/285; G06F 16/3344; G06F 16/3346; G06F 16/35; G06F 16/353; G06F 16/355; G06F 40/295; G06F 40/30; G06F 18/2155; G06F 18/23; G06F 18/2411; G06F 18/2413; G06F 18/24155
See application file for complete search history.

(56) References Cited

U.S. PATENT DOCUMENTS

| | | |
|---|---|---|
| 8,086,468 B2 | 12/2011 | Kim |
| 10,311,206 B2 | 6/2019 | Boloor et al. |
| 10,628,553 B1 | 4/2020 | Murrish et al. |
| 10,784,000 B2 | 9/2020 | Wu et al. |
| 11,398,299 B2 | 7/2022 | Chen et al. |
| 11,861,718 B1 * | 1/2024 | Kemp ................ G06Q 40/08 |

(Continued)

FOREIGN PATENT DOCUMENTS

WO 2022/155607 A1 7/2022

OTHER PUBLICATIONS

"Alcohol Use—Facts & Resources," SAMHSA, Substance Abuse and Mental Health Administration, (2 pages), (article), [Retrieved from the Internet Mar. 31, 2023] <URL: https://www.samhsa.gov/sites/default/files/alcohol-use-facts-resources-fact-sheet.pdf>.

(Continued)

*Primary Examiner* — Robert W Beausoliel, Jr.
*Assistant Examiner* — Cheryl M Shechtman
(74) *Attorney, Agent, or Firm* — ALSTON & BIRD LLP

(57) ABSTRACT

Various embodiments of the present disclosure provide methods, apparatus, systems, computing devices, computing entities, and/or the like for classifying unstructured data by: (i) generating probability scores of natural language classification labels for classifying unstructured data elements using an NLP-based model, (ii) generating probability scores of structured data classification labels for classifying the unstructured data elements using a classification-based model, and (iii) assigning classifications labels based on: a) the probability scores of the natural language classification labels if a distance measure difference associated with the natural language classification labels is greater than a predetermined distance, or b) a determination using an ensemble model if the distance measure difference is less than a predetermined distance.

20 Claims, 11 Drawing Sheets

(56) References Cited

U.S. PATENT DOCUMENTS

| | | | |
|---|---|---|---|
| 2019/0057774 A1 | 2/2019 | Velez et al. | |
| 2019/0392441 A1* | 12/2019 | Lee | G06N 20/00 |
| 2020/0153703 A1* | 5/2020 | Peterkin | G06N 7/01 |
| 2020/0387810 A1 | 12/2020 | Hodgson et al. | |
| 2021/0074398 A1* | 3/2021 | Fong | G16H 15/00 |
| 2021/0200515 A1* | 7/2021 | Rayapati | G06F 40/216 |
| 2021/0201018 A1* | 7/2021 | Patel | G06F 18/22 |
| 2021/0295992 A1 | 9/2021 | Al-Sinan et al. | |
| 2021/0358601 A1 | 11/2021 | Pillai et al. | |
| 2023/0215576 A1* | 7/2023 | Loupy | G16H 50/30 702/19 |

OTHER PUBLICATIONS

"Areas of Focus," OHDSI—Observational Health Data Sciences and Informatics, (2 pages), [article, online], (Year: 2023), [Retrieved from the Internet Mar. 31, 2023] <URL: https://www.ohdsi.org/who-we-are/areas-of-focus/.

"Using Natural Language Processing (NLP) To Make Use Of Electronic Health Records Text Fields For Medical Research," Prometheus|Research, (6 pages), Sep. 2015, [Retrieved from the Internet Mar. 31, 2023] <URL: https://www.prometheusresearch.com/using-natural-language-processing-nlp-to-make-us-of-ehr-text-fields-for-medical-research/.

"Word Mover's Distance (WMD) Explained: An Effective Method of Document Classification," Towards AI, Natural Language Processing, Sep. 21, 2020, (8 pages), available online: https://towardsai.net/p/nlp/word-movers-distance-wmd-explained-an-effective-method-of-document-classification-89cb258401f4.

Ashish, Naveen et al. "Medical Data Transformation Using Rewriting," Frontiers In Neuroinformatics, vol. 9, Article . 1, pp. 1-8, Feb. 20, 2015, DOI: 10.3389/FNINF.2015.00001.

Heintzelman, Norris H et al. "Longitudinal Analysis Of Pain In Patients With Metastatic Prostate Cancer Using Natural Language Processing Of Medical Record Text," Journal of the American Medical Informatics Association, vol. 20, Issue 5, Sep. 2013, pp. 898-905, https://doi.org/10.1136/amiajnl-2012-001076.

Sohn, Sunghwan et al. "Mayo Clinic Smoking Status Classification System: Extensions and Improvements," AMIA Annual Symposium Proceedings Archive, vol. 2009, pp. 619-623, Nov. 14, 2009, PMCID: PMC2815365, PMID: 20351929, https://www.ncbi.nlm.nih.gov/pmc/articles/PMC2815365/pdf/amia-f2009-619.pdf.

* cited by examiner

FIG. 8

MACHINE LEARNING TECHNIQUES FOR NORMALIZATION OF UNSTRUCTURED DATA INTO STRUCTURED DATA

BACKGROUND

Various embodiments of the present disclosure address technical challenges related to performing predictive data analysis for standardizing data and provide solutions to address the efficiency and reliability shortcomings of existing data standardization solutions.

BRIEF SUMMARY

In general, various embodiments of the present disclosure provide methods, apparatus, systems, computing devices, computing entities, and/or the like for performing data standardization on unstructured data.

In accordance with one aspect, a method is provided. In one embodiment, the method comprises: for each of one or more unstructured data elements of classification input data, generating, by a computing entity and using a natural language processing (NLP) machine learning model, an NLP candidate classification label; for each of the one or more unstructured data elements, generating, by the computing entity and using a structured data classification machine learning model, a structured data candidate classification label associated with the unstructured data element based at least in part on structured data; classifying, by the computing entity and using a common data classification machine learning model, each of the one or more unstructured data elements based at least in part on each NLP candidate classification label and each structured data candidate classification label, wherein classifying each of the one or more unstructured data elements comprises: (a) determining a distance measure difference between a top-ranking synonymous word associated with the unstructured data element and a next top-ranking synonymous word associated with the unstructured data element, (b) assigning a selected NLP candidate classification label to the unstructured data element based at least in part on the distance measure difference being above a threshold, and (c) using, based at least in part on the distance measure difference being below the threshold, an ensemble machine learning model to: (i) determine a top-ranking structured data candidate classification label matching a top-ranking NLP candidate classification label associated with the top-ranking synonymous word, and (ii) for each instance of the top-ranking structured data candidate classification label that does not match the top-ranking NLP candidate classification label, generate an aggregate probability score based at least in part on the NLP candidate classification label and the structured data candidate classification label; and initiating, by the computing entity, the performance of one or more prediction-based actions based at least in part on the classification of the one or more unstructured data elements.

In accordance with another aspect, an apparatus comprising at least one processor and at least one memory including computer program code is provided. In one embodiment, the at least one memory and the computer program code may be configured to, with the processor, cause the apparatus to for each of one or more unstructured data elements of classification input data, generate, using a natural language processing (NLP) machine learning model, an NLP candidate classification label; for each of the one or more unstructured data elements, generate, using a structured data classification machine learning model, a structured data candidate classification label associated with the unstructured data element based at least in part on structured data; classify, using a common data classification machine learning model, each of the one or more unstructured data elements based at least in part on each NLP candidate classification label and each structured data candidate classification label, wherein classifying each of the one or more unstructured data elements comprises: (a) determining a distance measure difference between a top-ranking synonymous word associated with the unstructured data element and a next top-ranking synonymous word associated with the unstructured data element, (b) assigning a selected NLP candidate classification label to the unstructured data element based at least in part on the distance measure difference being above a threshold, and (c) using, based at least in part on the distance measure difference being below the threshold, an ensemble machine learning model to: (i) determine a top-ranking structured data candidate classification label matching a top-ranking NLP candidate classification label associated with the top-ranking synonymous word, and (ii) for each instance of the top-ranking structured data candidate classification label that does not match the top-ranking NLP candidate classification label, generate an aggregate probability score based at least in part on the NLP candidate classification label and the structured data candidate classification label; and initiate the performance of one or more prediction-based actions based at least in part on the classification of the one or more unstructured data elements.

In accordance with yet another aspect, a computer program product is provided. The computer program product may comprise at least one computer-readable storage medium having computer-readable program code portions stored therein, the computer-readable program code portions comprising executable portions configured to for each of one or more unstructured data elements of classification input data, generate, using a natural language processing (NLP) machine learning model, an NLP candidate classification label; for each of the one or more unstructured data elements, generate, using a structured data classification machine learning model, a structured data candidate classification label associated with the unstructured data element based at least in part on structured data; classify, using a common data classification machine learning model, each of the one or more unstructured data elements based at least in part on each NLP candidate classification label and each structured data candidate classification label, wherein classifying each of the one or more unstructured data elements comprises: (a) determining a distance measure difference between a top-ranking synonymous word associated with the unstructured data element and a next top-ranking synonymous word associated with the unstructured data element, (b) assigning a selected NLP candidate classification label to the unstructured data element based at least in part on the distance measure difference being above a threshold, and (c) using, based at least in part on the distance measure difference being below the threshold, an ensemble machine learning model to: (i) determine a top-ranking structured data candidate classification label matching a top-ranking NLP candidate classification label associated with the top-ranking synonymous word, and (ii) for each instance of the top-ranking structured data candidate classification label that does not match the top-ranking NLP candidate classification label, generate an aggregate probability score based at least in part on the NLP candidate classification label and the structured data candidate classification label; and initiate the performance of one or more prediction-based actions based at least in part on the classification of the one or more unstructured data elements.

BRIEF DESCRIPTION OF THE DRAWINGS

Figure 1:
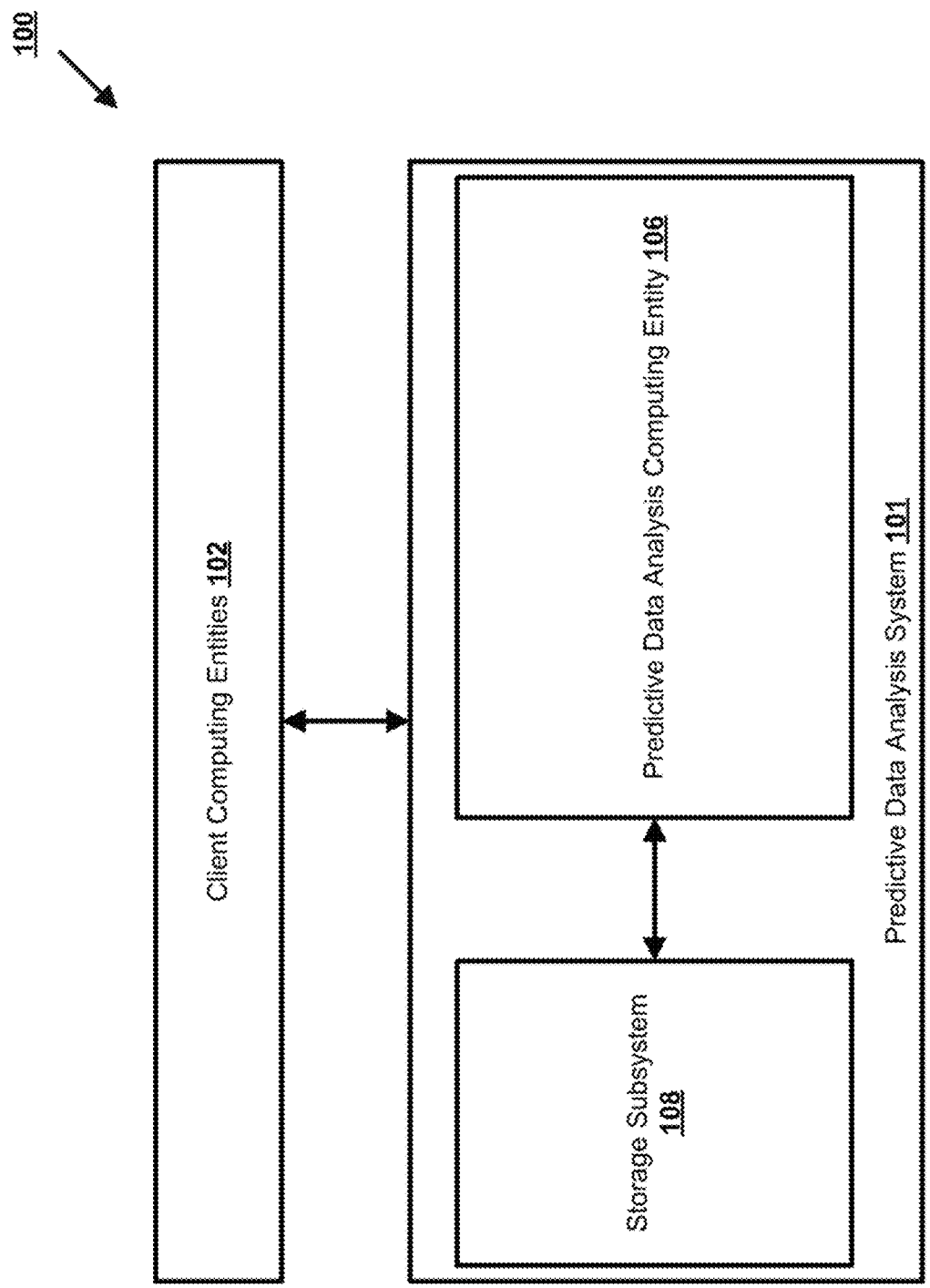

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
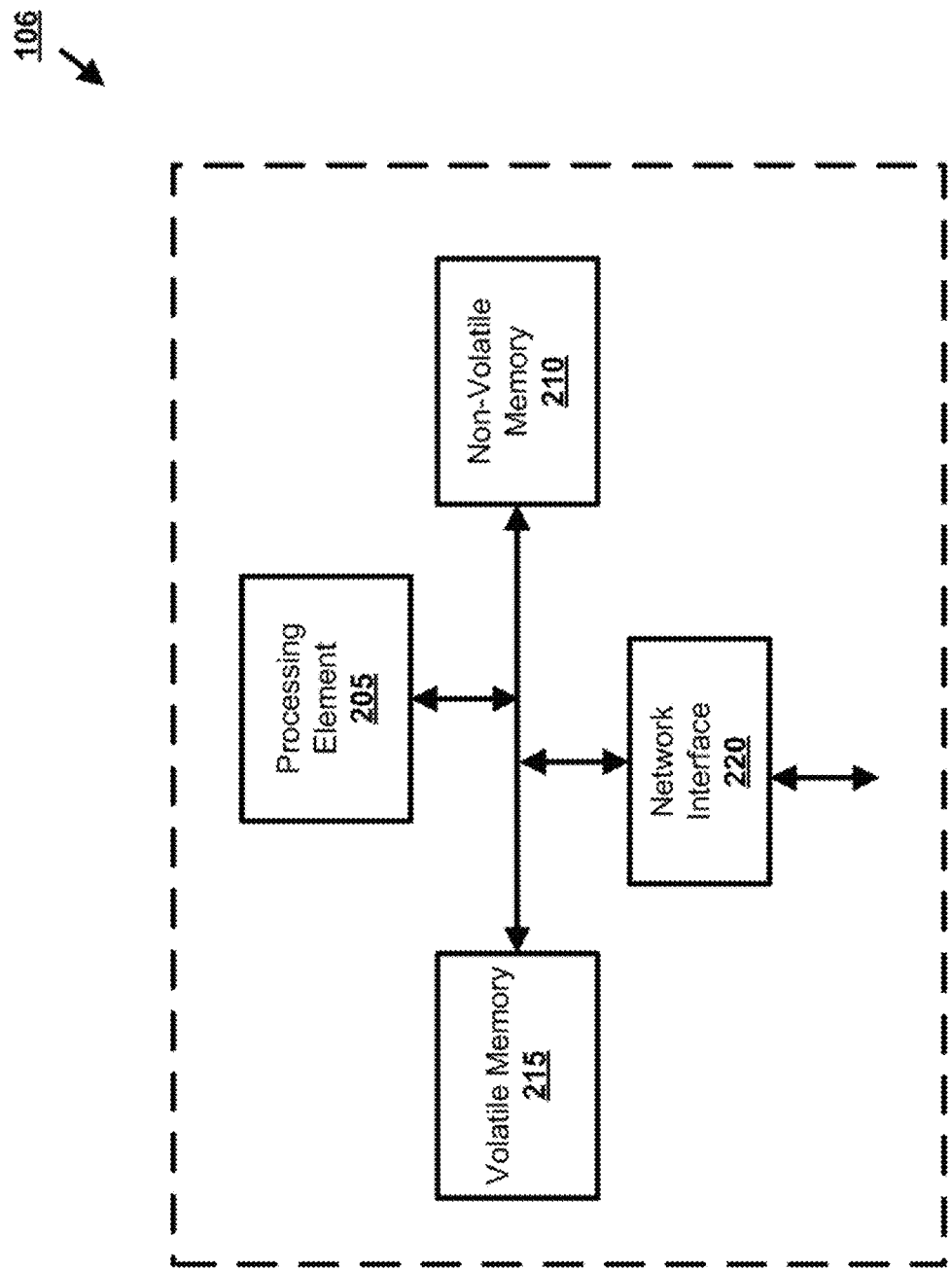

FIG. 2 provides an example predictive data analysis computing entity in accordance with some embodiments discussed herein.

Figure 3:
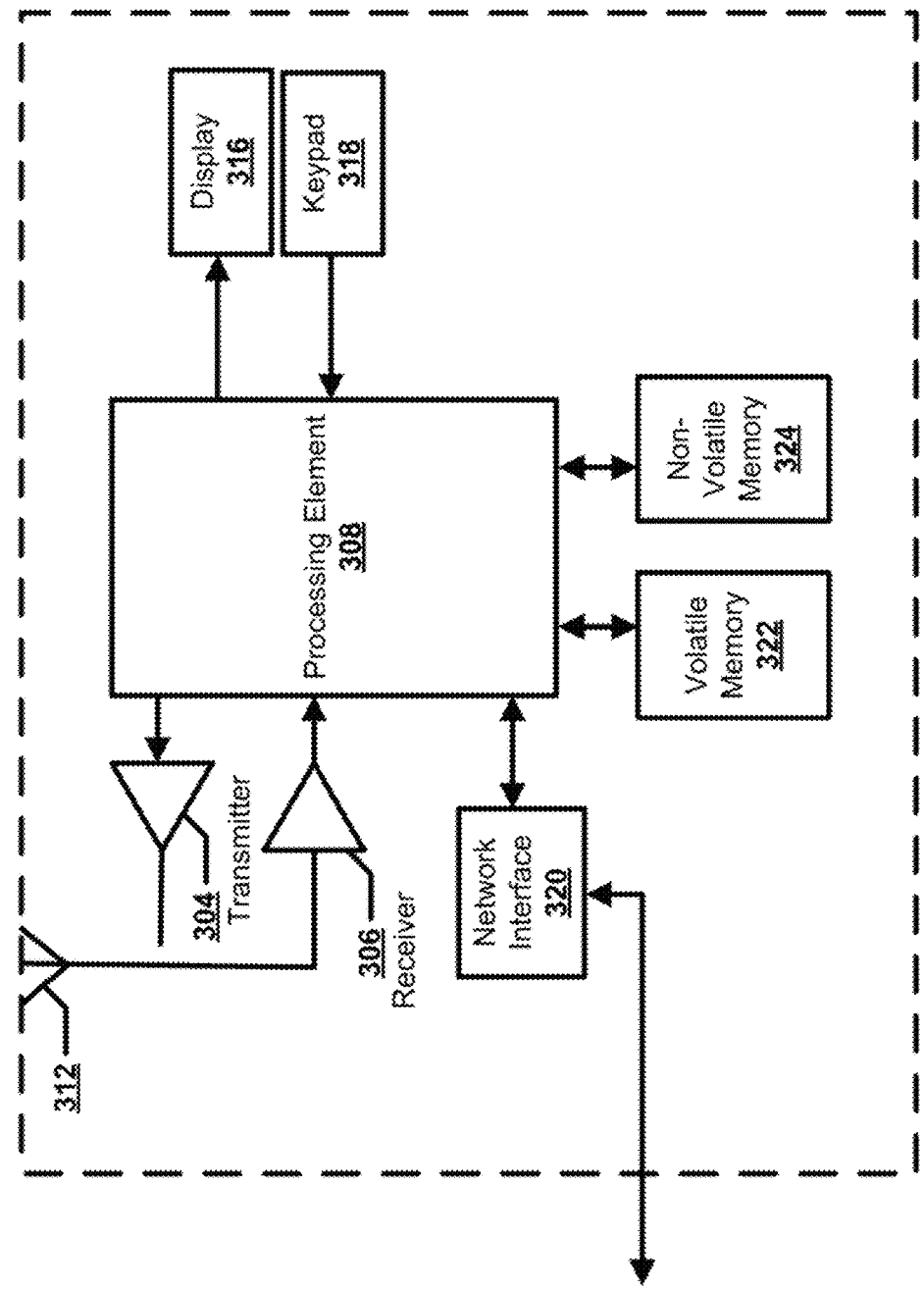

FIG. 3 provides an example client computing entity in accordance with some embodiments discussed herein.

Figure 4:
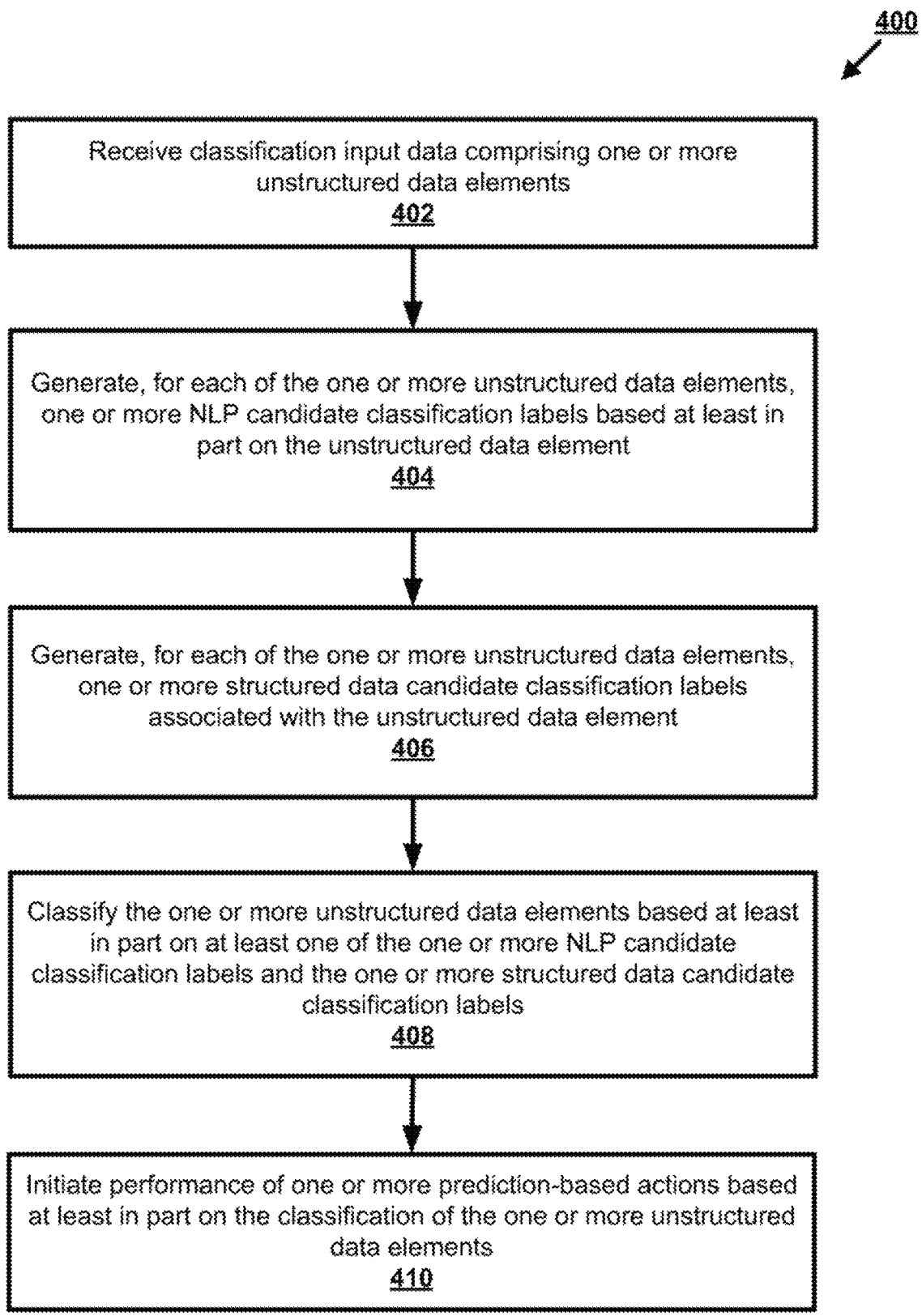

FIG. 4 is a flowchart diagram of an example process for performing predictive operations on classification input data comprising unstructured data in accordance with some embodiments discussed herein.

Figure 5:
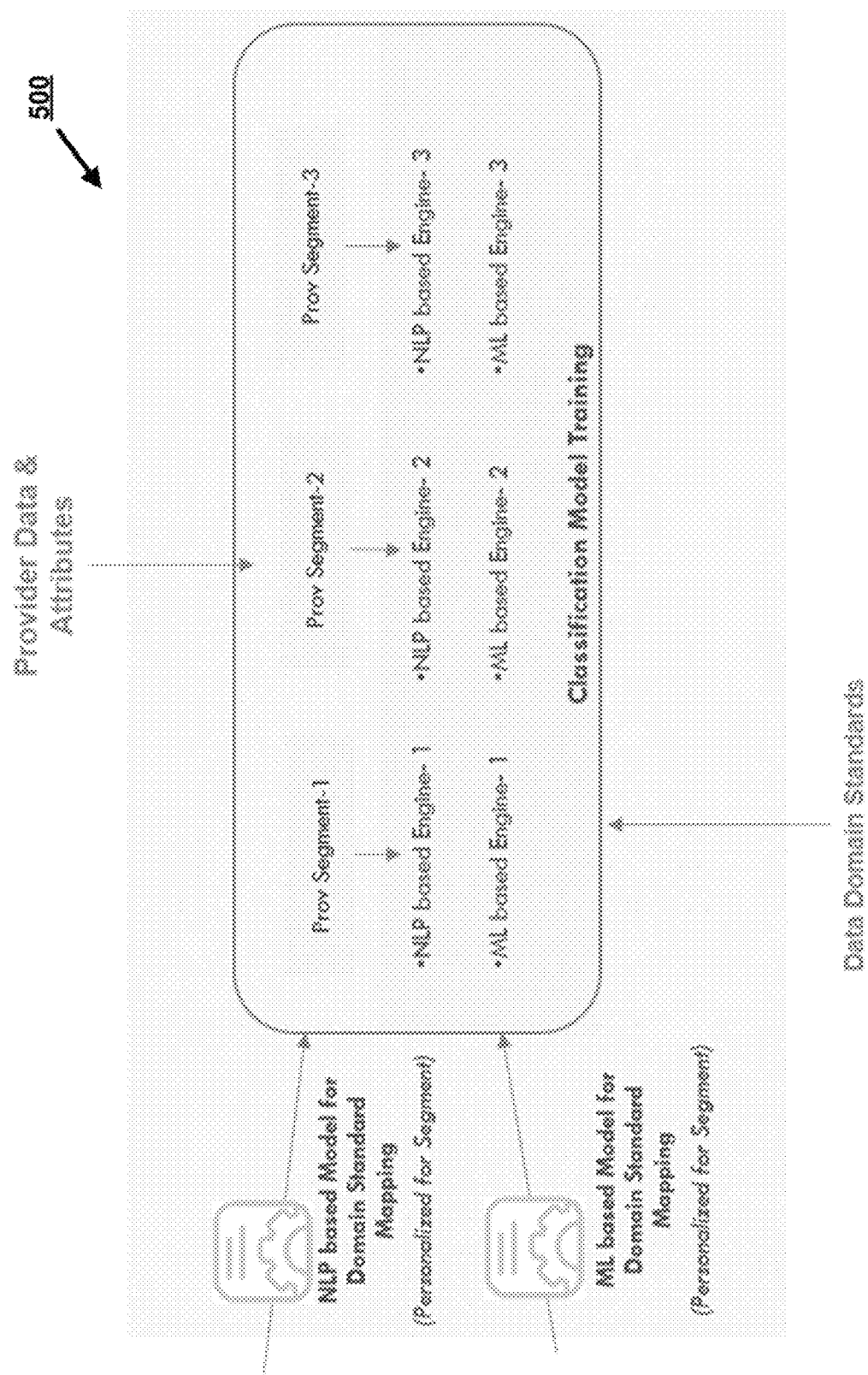

FIG. 5 depicts an operational example of a common data classification machine learning model in accordance with some embodiments discussed herein.

Figure 6:
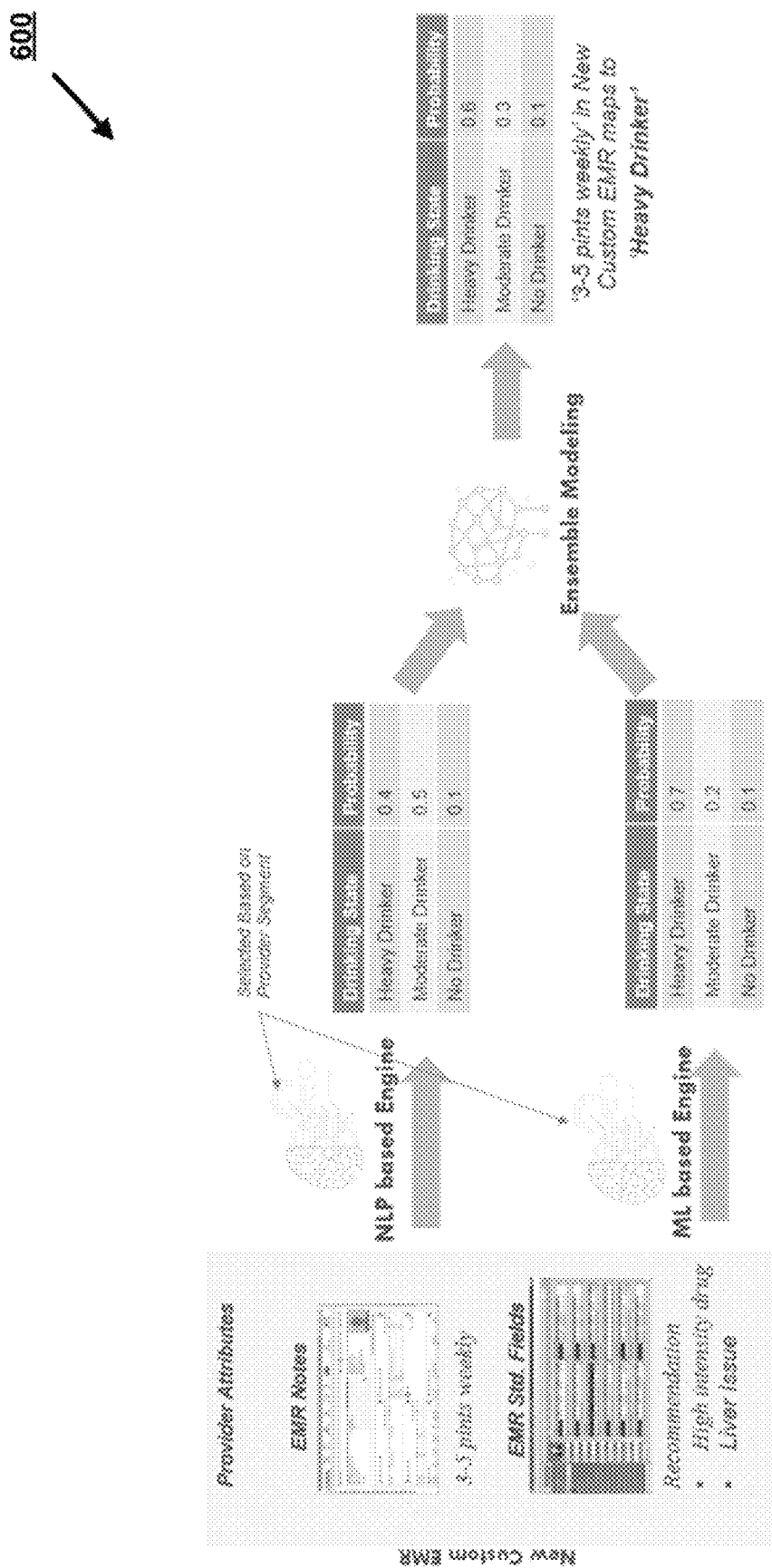

FIG. 6 depicts an exemplary common data model framework in accordance with some embodiments discussed herein.

Figure 7:
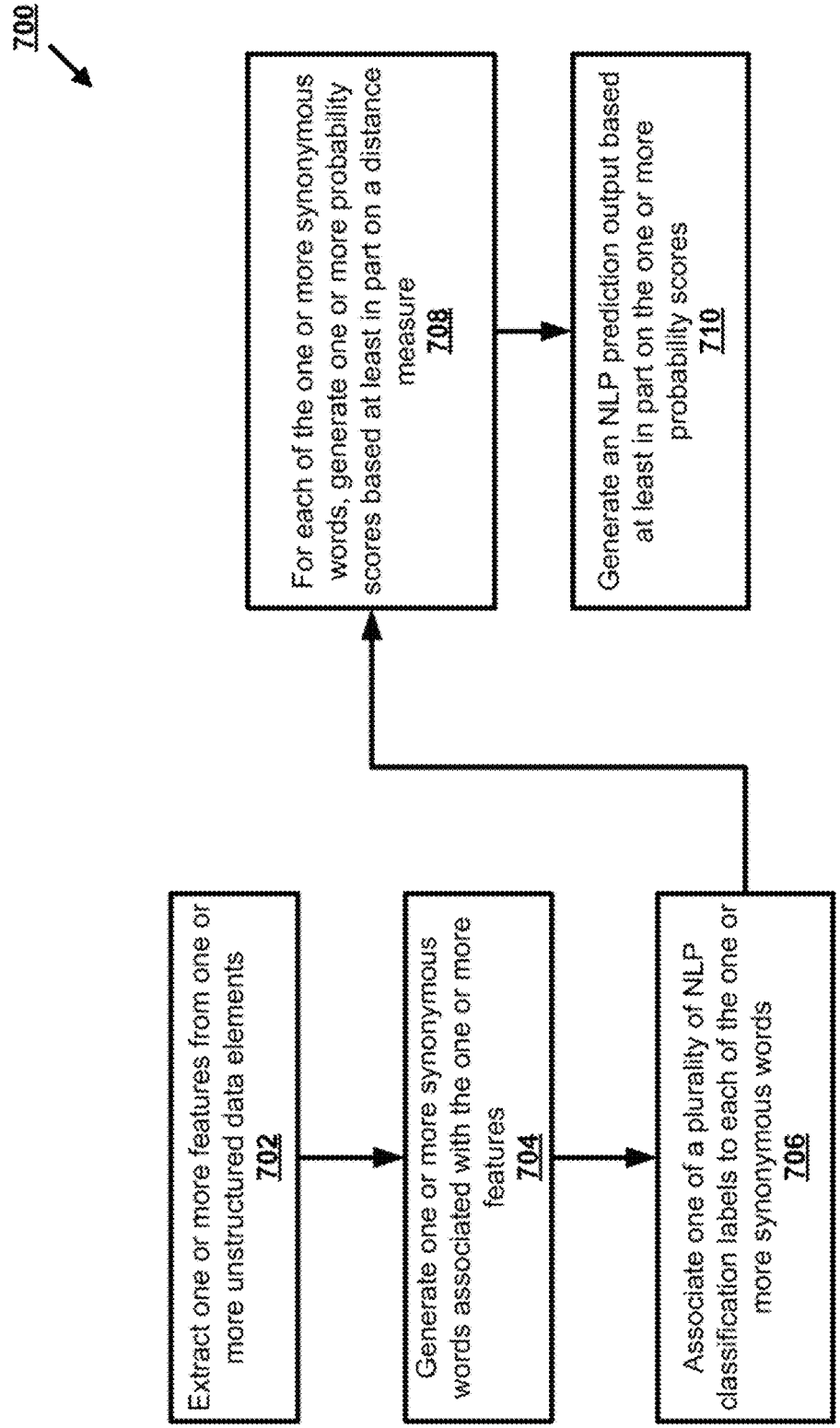

FIG. 7 is a flowchart diagram of an example process for generating one or more NLP candidate classification labels in accordance with some embodiments discussed herein.

Figure 8:
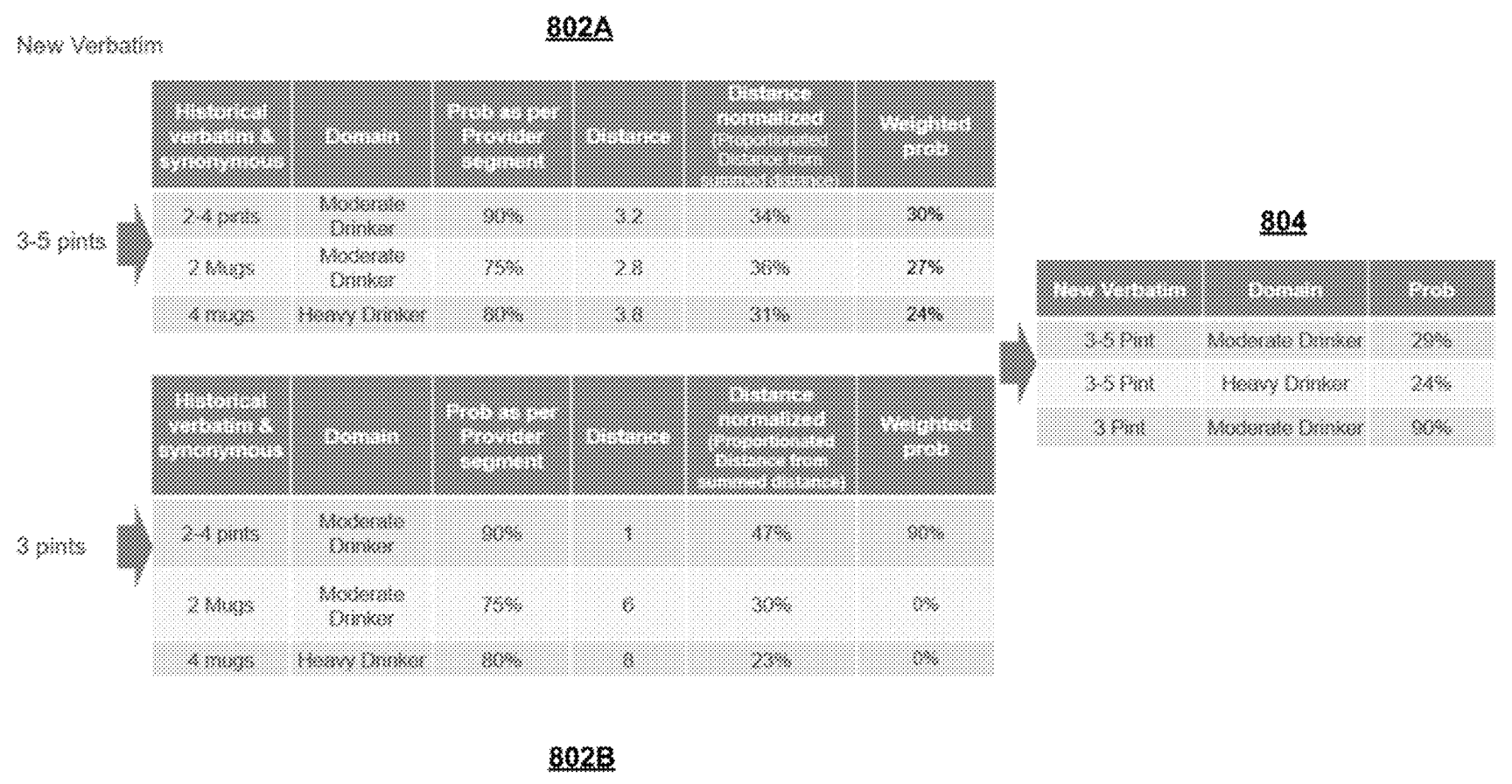

FIG. 8 depicts an operational example of a prediction output generated by an NLP machine learning model in accordance with some embodiments discussed herein.

Figure 9:
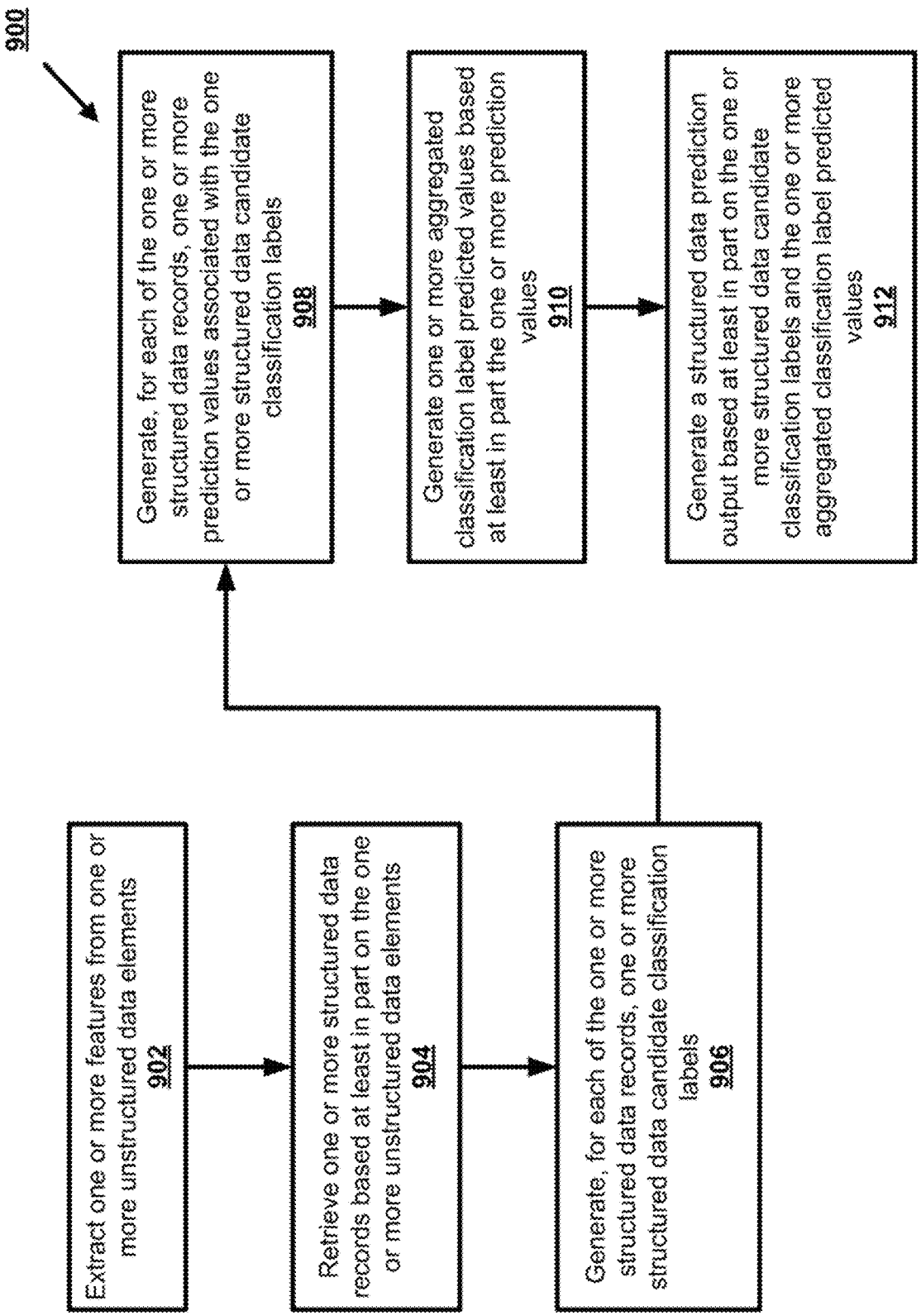

FIG. 9 is a flowchart diagram of an example process for generating one or more structured data candidate classification labels in accordance with some embodiments discussed herein.

Figure 10:
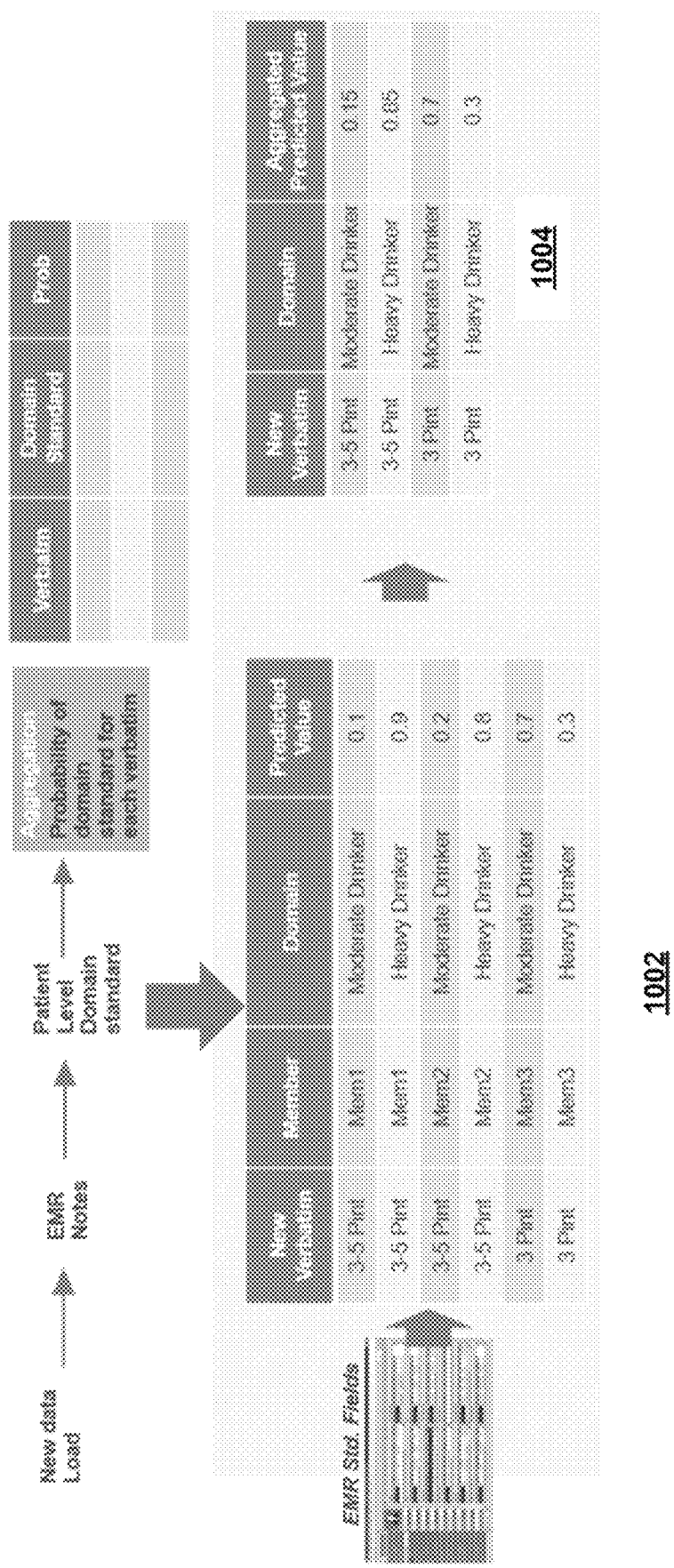

FIG. 10 depicts an operational example of a prediction output generated by a structured data classification machine learning model in accordance with some embodiments discussed herein.

Figure 11:

FIG. 11 an operational example of a prediction output generated by an ensemble machine learning model in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. Overview and Technical Improvements

Various embodiments of the present disclosure make important technical contributions to improving predictive accuracy of predictive machine learning models by combining prediction outputs of distinct machine learning models simultaneously applied towards classification of unstructured data, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. (Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

For example, various embodiments of the present disclosure improve predictive accuracy of predictive machine learning models by combining prediction outputs of distinct machine learning models simultaneously applied towards classification of unstructured data. As described herein, unstructured data may comprise data features that are presented or provided in a manner that may not be easily-interpretable by a machine and may not conform with any particular format or data domain standard, such as data provided in custom electronic medical record (EMR) systems. As such, individual machine learning models may not be capable of generating accurate or reliable predictions for unstructured data. Indeed, machine learning model systems may have their limitations and generating a machine learning model with high accuracy may be challenging and computationally complex.

However, in accordance with various embodiments of the present disclosure, a common data model framework may be used to standardize unstructured data in accordance with a data domain standard. The common data model framework may comprise a natural language processing (NLP) machine learning model, a structured data classification machine learning model, an ensemble machine learning model, and a common data classification machine learning model. The NLP machine learning model and the structured data classification machine learning model may be individually trained and created for use by the common data model framework. Specifically, the common data model framework may simultaneously leverage the NLP machine learning model and the structured data classification machine learning model to boost the overall accuracy. The NLP machine learning model and the structured data classification machine learning model may be combined by selectively merging prediction outputs generated by each model. Such an approach allows the generation of better predictive performance compared to a single model. Especially, this technique will lead to higher accuracy of performing predictive operations on unstructured data. In doing so, the techniques described herein improve efficiency and speed of training predictive machine learning models, thus reducing the number of computational operations needed and/or the amount of training data entries needed to train predictive machine learning models. That is, for the same increase in compute, storage, or communication resources for marginal accuracy improvement of a single model, improvement in accuracy may be greater by using a combination of machine learning models. Accordingly, the techniques described herein improve at least one of the computational efficiency, storage-wise efficiency, and speed of training predictive machine learning models.

Moreover, various embodiments of the present disclosure make important technical contributions to improving resource-usage efficiency of post-prediction systems by using combined predictions (e.g., from an NLP machine learning model and a structured data classification machine learning model) to set the number of allowed computing entities used by the noted post-prediction systems. For example, in some embodiments, a predictive data analysis computing entity determines D classifications for D unstructured data elements based at least in part on D unstructured data-wide embedded representations for the D unstructured data elements. Then, the count of unstructured data elements that are associated with an affirmative classification, along with a resource utilization ratio for each unstructured data element, can be used to predict a predicted number of computing entities needed to perform post-prediction processing operations (e.g., automated investigation operations) with respect to the D unstructured data elements. For example, in some embodiments, the number of computing entities needed to perform post-prediction processing operations (e.g., automated investigation operations) with respect to D unstructured data elements can be determined based at least in part on the output of the equation:

$$R = \text{ceil}\left(\sum_{k}^{k=K} ur_k\right),$$

where R is the predicted number of computing entities needed to perform post-prediction processing operations with respect to the D unstructured data element, ceil(·) is a ceiling function that returns the closest integer that is greater than or equal to the value provided as the input parameter of the ceiling function, k is an index variable that iterates over K unstructured data elements among the D unstructured data elements that are associated with affirmative classifications, and $ur_k$ is the estimated resource utilization ratio for a kth unstructured data element that may be determined based at least in part on a count of characters/tokens/words in the kth unstructured data element. In some embodiments, once R is generated, the predictive data analysis computing entity can use R to perform operational load balancing for a server system that is configured to perform post-prediction processing operations (e.g., automated investigation operations) with respect to D unstructured data elements. This may be done by allocating computing entities to the post-prediction processing operations if the number of currently-allocated computing entities is below R, and deallocating currently-allocated computing entities if the number of currently-allocated computing entities is above R.

II. Definitions

The term "classification input data" may refer to a data construct that describes a dataset comprising one or more electronic data records provided as input to a machine learning model. The electronic data records received from one of a plurality of disparate data systems for transformation into normalized data. For example, classification input data may comprise data records from a data system that is provided to a common data model framework for transformation (e.g., data standardization) to a common data format such that analytical routines may be performed on the data.

The term "common data model framework" may refer to a system architecture that can be used to standardized data, such as unstructured data, from a variety of data systems, which allows for data and information exchange between different applications and data sources. For example, a common data model framework may organize data from many sources that are in different formats into a standard structure so that related applications can operate on and share the same data. In one embodiment, a common data model framework may comprise an NLP machine learning model, a structured data classification machine learning model, an ensemble machine learning model, and a common data classification machine learning model, wherein the common data classification machine learning model may be configured to classify unstructured data elements from unstructured data based at least in part on prediction output generated by the NLP machine learning model, the structured data classification machine learning model, and the ensemble machine learning model.

The term "common data classification machine learning model" may refer to a data construct that describes parameters, hyperparameters, and/or defined operations of a machine learning model that is configured to classify unstructured data. According to various embodiments of the present disclosure, a common data classification machine learning model may be used to classify one or more unstructured data elements based at least in part on at least one of one or more NLP candidate classification labels and one or more structured data candidate classification labels. A common data classification machine learning model may be trained to classify one or more unstructured data elements based at least in part on prediction outputs generated by an NLP machine learning model and prediction outputs generated by a structured data classification machine learning model.

The term "classify" may refer to a process comprising an assignment of one or more classification labels to a dataset. Classification may be performed by a machine learning model on classification input data. For example, a common data classification machine learning model may be used to perform classification by assigning classification labels to, for example, unstructured data elements. According to various embodiments of the present disclosure, an unstructured data element may be classified by a common data classification machine learning model trained based at least in part on prediction outputs generated by an NLP machine learning model and prediction outputs generated by a structured data classification machine learning model. In one embodiment, classifying an unstructured data element may comprise ranking NLP candidate classification labels and structured data candidate classification labels, determining one or more of: i) a synonymous word comprising a best distance measure that is greater than a best distance threshold, ii) a distance measure difference between a top-ranking synonymous word associated with the unstructured data element and a next top-ranking synonymous word associated with the unstructured data element being greater than a minimum distance threshold, and iii) a top-ranking synonymous word comprising a distance measure that is at least a given proportion (e.g., a percentage) higher than a distance measure of a next-top ranking synonymous word, and assigning to the unstructured data element an NLP candidate classification label associated based at least in part on the one or more determinations. Otherwise, if the distance measure difference is below the threshold, the top-ranking NLP candidate classification label may be confirmed with a top-ranking structured data candidate classification label via an ensemble model.

The term "distance measure" may refer to a data construct that describes a quantitative value representative of similarity between two words, documents, sentences, or any other text structure.

The term "distance measure difference" may refer to a data construct that describes a difference between distance measures. For example, a distance measure difference may comprise a difference between a distance measure of a top-ranking synonymous word and a distance measure of a next top-ranking synonymous word.

The term "unstructured data" may refer to a data construct that describes data that is not arranged according to a preset data model or schema. Unstructured data may comprise data that cannot be easily processed or analyzed easily by artificial intelligence or machine learning systems. As an example, unstructured data may comprise free-form text that may be stored in text fields of an electronic data record. An electronic data record may comprise historical or current data. As such, unstructured data may include irregularities or ambiguities and may not be in a format suitable for data processing or analytics. An example of unstructured data may comprise one or more electronic medical records representative of medical and treatment history associated with one or more patients.

The term "unstructured data element" may refer to a data construct that describes a portion of unstructured data associated with a data field of an electronic data record. For example, an unstructured data element may comprise an entry in an electronic medical record for a patient.

The term "data domain standard" may refer to a data construct that describes a boundary of values that a data element may contain. A data domain standard may comprise a set of standardized data values for certain fields or data types associated with a data model or schema. For example, a data domain standard may comprise one or more standardized extensible data schemas including entities, attributes, semantic metadata, and relationships, which represent commonly used concepts and activities in various domains, such as automotive, banking, commerce, educational, healthcare, marketing, sales, legal and non-profit institutions.

The term "localization parameter" may refer to a data construct that describes conventions that are applicable to a particular context, such as location, language, culture, or target audience, that may affect interpretation of certain data values.

The term "NLP candidate classification label" may refer to a data construct that describes a classification label that may be assigned to synonymous words associated with an unstructured data element and used to classify the unstructured data element. An NLP candidate classification label may comprise a description, tag, or identifier representative of features of an unstructured data element defined in accordance with a data domain standard. In one embodiment, an NLP candidate classification label may be associated with a synonymous word selected from a predefined vocabulary of representative text. The synonymous word may be selected by an NLP machine learning model to match with an unstructured data element. One or more synonymous words may be selected for a given unstructured data element where an NLP candidate classification label may be generated for each synonymous word. According to various embodiments of the present disclosure, an NLP candidate classification label may be generated as prediction output of an NLP machine learning model.

The term "NLP machine learning model" may refer to a data construct that describes parameters, hyperparameters, and/or defined operations of a machine learning model that is configured to generate prediction output comprising one or more NLP candidate classification labels based at least in part on one or more unstructured data elements. The NLP machine learning model may be trained based at least in part on a pre-defined vocabulary of representative text associated with a data domain standard and application-specific data and attributes. An NLP machine learning model may comprise any one of word mover's distance, support vector machine, bag-of-words, term frequency-inverse document frequency, latent semantic analysis, linear discriminant analysis, mixed sample data augmentation, combinatory categorical grammar, and Naïve Bayes. Prediction output generated by an NLP machine learning model may further comprise probability scores determined for one or more NLP candidate classification labels based at least in part on a distance measure (e.g., semantic distance) between an unstructured data element and synonymous words from a pre-defined vocabulary. For example, a probability distribution over a set of NLP candidate classification labels may be generated by an NLP machine learning model. If a highest-ranking synonymous word (e.g., minimum distance measure) comprises a distance measure difference with a next highest-ranking synonymous word that satisfies a distance threshold (e.g., x times lesser than or y distance smaller than next minimum distance measure of another synonymous word), an NLP candidate classification label associated with the highest-ranking synonymous word may be assigned to the unstructured data element, thus classifying the unstructured data element. Otherwise, if the distance measure does not satisfy the distance threshold, the NLP candidate classification label associated with the closest synonymous word may be compared with a highest-ranking structured data candidate classification label.

The term "structured data" may refer to a data construct that describes data that conforms to a preset data model, schema, or is organized in a manner that is easily decipherable by artificial intelligence or machine learning systems. Structured data may comprise features usable by a structured data classification machine learning model to generate classification predictions. According to various embodiments of the present disclosure, structured data may be retrieved by a structured data classification machine learning model and used as classification input data to generate structured data candidate classification labels. In one embodiment, structured data may comprise one or more data entries in fields representative of specific attributes in accordance with a data domain standard. Structured data record may comprise historical or current data. For example, in a particular implementation related to healthcare systems, structured data may comprise data from billing systems, claims systems, or any system that generates standardized data, such as codes for diagnostics, lab results, and recommended treatment.

The term "structured data candidate classification label" may refer to a data construct that describes a classification label that may be generated based at least in part on structured data associated with an unstructured data element and used to classify the unstructured data element. A structured data candidate classification label may comprise a description, tag, or identifier representative of features of an unstructured data element defined in accordance with a data domain standard. According to various embodiments of the present disclosure, a structured data candidate classification label may be generated as prediction output of a structured data classification machine learning model.

The term "structured data classification machine learning model" may refer to a data construct that describes parameters, hyperparameters, and/or defined operations of a machine learning model that is configured to generate prediction output comprising one or more structured data candidate classification labels associated with one or more unstructured data elements. The structured data classification machine learning model may be trained based at least in part on structured data associated with a data domain standard and application-specific data and attributes. The structured data classification machine learning model may generate one or more structured data candidate classification labels based at least in part on structured data associated with classification input data. In one embodiment, a structured data classification machine learning model may comprise a multi-class classification machine learning model configured to classify structured data into one of a plurality of structured data candidate classification labels associated with a data domain standard. The structured data classification machine learning model may comprise classification models, such as XG boost, Random Forest, and logistic regression. Prediction output generated by a structured data classification machine learning model may further comprise probability scores associated with one or more structured data candidate classification label. For example, a probability distribution over a set of structured data candidate classification labels may be generated by a structured data classification machine learning model. In one embodiment, probability scores may be determined for one or more structured data candidate classification labels based at least in part on structured data. For example, one or more features may be identified from structured data and used by a structured data classification machine learning model to determine probability scores of one or more structured data candidate classification labels matching an unstructured data element.

The term "ensemble machine learning model" may refer to a data construct that describes parameters, hyperparameters, and/or defined operations of a machine learning model that is configured to generate prediction output comprising a classification of unstructured data elements based at least in part on a combination of prediction outputs from a plurality of machine learning models, such as an NLP machine learning model and a structured data classification machine learning model. In one embodiment, a common data model framework may classify a unstructured data element based at least in part on an ensemble machine learning model determining a top-ranking one of one or more structured data candidate classification labels matching a top-ranking one of one or more NLP candidate classification labels when a synonymous word associated with the top-ranking NLP candidate classification label comprises a distance measure difference with a next top-ranking synonymous word associated with the unstructured data element is below a threshold. For each instance the top-ranking one of the one or more structured data candidate classification labels that does not match the top-ranking one of the one or more NLP candidate classification labels when the distance measure difference is below the threshold, the ensemble machine learning model may determine aggregate probability scores of the one or more NLP candidate classification labels and the one or more structured data candidate classification labels, and the common data model framework may classify unstructured data elements based at least in part on the aggregate probability scores.

The term "probability score" may refer to a data construct that describes a quantitative value representative of a likelihood of a candidate classification label being descriptive of an unstructured data element.

The term "aggregate probability score" may refer to a data construct that describes a quantitative value representative of a likelihood of an NLP candidate classification label being descriptive of an unstructured data element based at least in part on two or more probability scores. Aggregate probability scores may be determined by an ensemble machine learning model and used to classify an unstructured data element. In one embodiment, for each instance the top-ranking one of the one or more structured data candidate classification labels that does not match the top-ranking one of the one or more NLP candidate classification labels when a synonymous word associated with the top-ranking NLP candidate classification label comprises a distance measure difference with a next top-ranking synonymous word associated with the unstructured data element is below a threshold, aggregate probability scores of the one or more NLP candidate classification labels and the one or more structured data candidate classification labels may be determined to classify an unstructured data element associated with the one or more NLP candidate classification labels and the one or more structured data candidate classification labels. An aggregate probability score may comprise a voting mechanism between, for example, an NLP machine learning model and a structured data classification machine learning model. As such, an ensemble machine learning model may generate prediction outputs based at least in part on a combination of prediction outputs from an NLP machine learning model and a structured data classification machine learning model. An aggregate probability score may be determined by performing an operation based at least in part on an NLP candidate probability distribution associated with the one or more NLP candidate classification labels and a structured data probability distribution associated with the one or more structured data candidate classification labels, where the operation may comprise summation, mean, or maximum. In one embodiment, an aggregate probability score may comprise a weighted sum of probability scores associated with the one or more NLP candidate classification labels and the one or more structured data candidate classification labels.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically initiate performance of prediction-based actions based at least in part on the generated predictions.

An example of a prediction-based action that can be performed using the predictive data analysis system 101 is a request for standardizing unstructured data from custom electronic data records to a common data format. For example, in accordance with various embodiments of the present disclosure, a common data model framework may be used to standardize unstructured data in accordance with a data domain standard. The common data model framework may comprise an NLP machine learning model, a structured data classification machine learning model, an ensemble machine learning model, and a common data classification machine learning model. The NLP machine learning model and the structured data classification machine learning model may be individually trained and created for use by the common data model framework. Specifically, the common data model framework may simultaneously leverage the NLP machine learning model and the structured data classification machine learning model to boost the overall accuracy. The NLP machine learning model and the structured data classification machine learning model may be combined by selectively merging prediction outputs generated by each model. Such an approach allows the generation of better predictive performance compared to a single model. Especially, this technique will lead to higher accuracy of performing predictive operations on unstructured data. In doing so, the techniques described herein improve efficiency and speed of training predictive machine learning models, thus reducing the number of computational operations needed and/or the amount of training data entries needed to train predictive machine learning models. That is, for the same increase in compute, storage, or communication resources for marginal accuracy improvement of a single model, improvement in accuracy may be greater by using a combination of machine learning models. Accordingly, the techniques described herein improve at least one of the computational efficiency, storage-wise efficiency, and speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically initiate performance of prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks, such as classifying unstructured data elements. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile memory 322 and/or non-volatile memory 324, which can be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present disclosure make important technical contributions to improving predictive accuracy of predictive machine learning models by combining prediction outputs of distinct machine learning models simultaneously applied towards classification of unstructured data, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. (Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time). Accordingly, techniques that improve predictive accuracy without harming training speed, such as the techniques described herein, enable improving training speed given a constant predictive accuracy. In doing so, the techniques described herein improving efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

Data standardization may be a critical process of bringing data, especially from a plurality of disparate data sources, into a common format for large scale analytics. Furthermore, some data, such as unstructured data, may comprise ambiguous data values when provided from systems supporting custom data entries. For example, in the healthcare field, data related to signs, disease, and symptoms, such as drinking, smoking, and severity of pain, are not captured coherently in many custom EMR systems. Capturing signs and symptoms are pivotal for health management. Data standardization enables analysis for development of personalized treatment guidelines. However, the process of performing data standardization is often time-consuming and requires custom algorithm or rules, especially when providers use custom EMR systems. Accordingly, embodiments of the present disclosure provides predictive data analysis for standardizing unstructured data according to a data domain standard of classification labels by using a combination of NLP and machine learning-based classification.

FIG. 4 is a flowchart diagram of an example process 400 for performing predictive operations on classification input data comprising unstructured data. Via the various steps/operations of the process 400, the predictive data analysis computing entity 106 can use a common data model framework comprising an NLP machine learning model, a structured data classification machine learning model, an ensemble machine learning model, and a common data classification machine learning model to generate candidate classification labels for unstructured data elements and classify the unstructured data elements based at least in part on the candidate classification labels.

In some embodiments, a common data model framework describes a system architecture that can be used to standardized data, such as unstructured data, from a variety of data systems, which allows for data and information exchange between different applications and data sources. For example, a common data model framework may organize data from many sources that are in different formats into a standard structure so that related applications can operate on and share the same data. In one embodiment, a common data model framework may comprise an NLP machine learning model, a structured data classification machine learning model, an ensemble machine learning model, and a common data classification machine learning model, wherein the common data classification machine learning model may be trained to classify unstructured data elements from unstructured data based at least in part on prediction output generated by the NLP machine learning model, the structured data classification machine learning model, and the ensemble machine learning model.

In some embodiments, unstructured data describes data that is not arranged according to a preset data model or schema. Unstructured data may comprise data that cannot be easily processed or analyzed easily by artificial intelligence or machine learning systems. As an example, unstructured data may comprise free-form text that may be stored in text fields of an electronic data record. An electronic data record may comprise historical or current data. As such, unstructured data may include irregularities or ambiguities and may not be in a format suitable for data processing or analytics. An example of unstructured data may comprise one or more electronic medical records representative of medical and treatment history associated with one or more patients.

The process 400 begins at step/operation 402 when the predictive data analysis computing entity 106 receives classification input data comprising one or more unstructured data elements. In some embodiments, classification input data describes a dataset comprising one or more electronic data records provided as input to a machine learning model. The electronic data records received from one of a plurality of disparate data systems for transformation into normalized data. For example, classification input data may comprise data records from a data system that is provided to a common data model framework for transformation (e.g., data standardization) to a common data format such that analytical routines may be performed on the data. In some embodiments, an unstructured data element describes a portion of unstructured data associated with a data field of an electronic data record. For example, an unstructured data element may comprise an entry in an electronic medical record.

At step/operation 404, the predictive data analysis computing entity 106 generates, using an NLP machine learning model, for each of the one or more unstructured data elements, one or more NLP candidate classification labels based at least in part on the unstructured data element. The NLP machine learning model may extract features from the one or more unstructured data elements and determine potential mappings for standardized classification labels via NLP candidate classification labels. Generating the one or more NLP candidate classification labels may comprise determining one or more synonymous words associated with each of the unstructured data elements. The one or more synonymous words may be selected from a pre-defined vocabulary of representative text associated with a data domain standard and application-specific data and attributes. The application-specific data and attributes may comprise localization parameters representative of conventions that are applicable to a particular context (e.g., location, language, culture, or target audience) of an application that may affect interpretation of certain data values.

In some embodiments, a data domain standard describes a boundary of values that a data element may contain. A data domain standard may comprise a set of standardized data values for certain fields or data types associated with a data model or schema. For example, a data domain standard may comprise one or more standardized extensible data schemas including entities, attributes, semantic metadata, and relationships, which represent commonly used concepts and activities in various domains, such as automotive, banking, commerce, educational, healthcare, marketing, sales, legal and non-profit institutions.

Based at least in part on the one or more synonymous words, one or more NLP candidate classification labels may be assigned to the one or more unstructured data elements. In some embodiments, an NLP candidate classification label describes a classification label that may be assigned to synonymous words associated with an unstructured data element and used to classify the unstructured data element. An NLP candidate classification label may comprise a description, tag, or identifier representative of features of an unstructured data element defined in accordance with a data domain standard. In one embodiment, an NLP candidate classification label may be associated with a synonymous word selected from a predefined vocabulary of representative text. The synonymous word may be selected by an NLP machine learning model to match with an unstructured data element. One or more synonymous words may be selected for a given unstructured data element where an NLP candidate classification label may be generated for each synonymous word. According to various embodiments of the present disclosure, an NLP candidate classification label may be generated as prediction output of an NLP machine learning model.

In some embodiments, an NLP machine learning model describes parameters, hyperparameters, and/or defined operations of a machine learning model that is configured to generate prediction output comprising one or more NLP candidate classification labels based at least in part on one or more unstructured data elements. The NLP machine learning model may be trained based at least in part on a pre-defined vocabulary of representative text associated with a data domain standard and application-specific data and attributes. An NLP machine learning model may comprise any one of word mover's distance, support vector machine, bag-of-words, term frequency-inverse document frequency, latent semantic analysis, linear discriminant analysis, mixed sample data augmentation, combinatory categorical grammar, and Naïve Bayes. Prediction output generated by an NLP machine learning model may further comprise probability scores determined for one or more NLP candidate classification labels based at least in part on a distance measure (e.g., semantic distance) between an unstructured data element and synonymous words from a pre-defined vocabulary. For example, a probability distribution over a set of NLP candidate classification labels may be generated by an NLP machine learning model.

If a highest-ranking synonymous word (e.g., minimum distance measure) comprises a distance measure difference with a next highest-ranking synonymous word that satisfies a distance threshold (e.g., x times lesser than or y distance smaller than next minimum distance measure of another synonymous word), an NLP candidate classification label associated with the highest-ranking synonymous word may be assigned to the unstructured data element, thus classifying the unstructured data element. Otherwise, if the distance measure does not satisfy the distance threshold, the NLP candidate classification label associated with the closest synonymous word may be compared with a highest-ranking structured data candidate classification label.

At step/operation 406, the predictive data analysis computing entity 106 generates, using a structured data classification machine learning model, for each of the one or more unstructured data elements, one or more structured data candidate classification labels associated with the unstructured data element, the one or more structured data candidate classification labels generated based at least in part on structured data. The structured data classification machine learning model may predict standardized classification labels via structured data candidate classification labels based at least in part on structured data associated with the one or more unstructured data elements, e.g., by using reverse conditional probability.

In some embodiments, a structured data candidate classification label describes a classification label that may be generated based at least in part on structured data associated with an unstructured data element and used to classify the unstructured data element. A structured data candidate classification label may comprise a description, tag, or identifier representative of features of an unstructured data element defined in accordance with a data domain standard. According to various embodiments of the present disclosure, a structured data candidate classification label may be generated as prediction output of a structured data classification machine learning model.

In some embodiments, a structured data classification machine learning model describes parameters, hyperparameters, and/or defined operations of a machine learning model that is configured to generate prediction output comprising one or more structured data candidate classification labels associated with one or more unstructured data elements. A structured data classification machine learning model may be trained based at least in part on structured data associated with a data domain standard and application-specific data and attributes. The structured data classification machine learning model may generate one or more structured data candidate classification labels based at least in part on structured data associated with classification input data. In one embodiment, a structured data classification machine learning model may comprise a multi-class classification machine learning model configured to classify structured data into one of a plurality of structured data candidate classification labels associated with a data domain standard. The structured data classification machine learning model may comprise classification models, such as XG boost, Random Forest, and logistic regression. Prediction output generated by a structured data classification machine learning model may further comprised probability scores associated with one or more structured data candidate classification label. For example, a probability distribution over a set of structured data candidate classification labels may be generated by a structured data classification machine learning model. In one embodiment, probability scores may be determined for one or more structured data candidate classification labels based at least in part on structured data. For example, one or more features may be identified from structured data and used by a structured data classification machine learning model to determine probability scores of one or more structured data candidate classification labels being representative of an unstructured data element.

In some embodiments, structured data describes data that conforms to a preset data model, schema, or is organized in a manner that is easily decipherable by artificial intelligence or machine learning systems. Structured data may comprise features usable by a structured data classification machine learning model to generate classification predictions. According to various embodiments of the present disclosure, structured data may be retrieved by a structured data classification machine learning model and used as classification input data to generate structured data candidate classification labels. In one embodiment, structured data may comprise one or more data entries in fields representative of specific attributes in accordance with a data domain standard. Structured data may comprise historical or current data. For example, in a particular implementation related to healthcare systems, structured data may comprise data from billing systems, claims systems, or any system that generates standardized data, such as codes for diagnostics, lab results, and recommended treatment.

At step/operation 408, the predictive data analysis computing entity 106 classifies, using a common data classification machine learning model, the one or more unstructured data elements based at least in part on at least one of the one or more NLP candidate classification labels and the one or more structured data candidate classification labels. The common data classification machine learning model may be trained to classify the one or more unstructured data elements based at least in part on prediction output comprising probability scores from the NLP machine learning model and the structured data machine learning model to classify one or more unstructured data elements.

In some embodiments, classifying describes a process comprising an assignment of one or more classification labels to a dataset, e.g., unstructured data. Classification may be performed by a machine learning model on classification input data. For example, a common data classification machine learning model may be used to perform classification by assigning classification labels to, for example, unstructured data elements. According to various embodiments of the present disclosure, an unstructured data element may be classified by a common data classification machine learning model trained based at least in part on prediction outputs generated by an NLP machine learning model and prediction outputs generated by a structured data classification machine learning model.

An operational example of a common data classification machine learning model 500 is depicted in FIG. 5. As depicted in FIG. 5, a common data classification machine learning model 500 may be trained based at least in part on prediction outputs from an NLP-based model for data domain standard mapping (e.g., NLP machine learning model) and a machine learning-based model for data domain standard mapping (e.g., structured data classification machine learning model). The prediction outputs may be generated using a training set comprising sample unstructured data and corresponding classification labels. As an example, the NLP-based model may generate prediction outputs for unstructured data in specific data fields of data records provided from systems data, and the machine learning-based model may generate prediction outputs for structured data.

The common data classification machine learning model 500 may be further trained with one or more selected data domain standards and application-specific data and attributes (e.g., of a healthcare provider, as depicted). The application-specific data and attributes may comprise localization parameters representative of conventions that are applicable to a particular context (e.g., location, language, culture, or target audience) of an application that may affect interpretation of certain data values. As such, the common data classification machine learning model 500 comprises a plurality of application (e.g., provider) segments that may be individually trained, created, and customized in accordance with specific data domain standards and application-specific data and attributes. That is, each application segment comprises an NLP-based engine and a ML-based engine that are configured according to a selected data domain standard and application-specific data and attributes.

In one embodiment, classifying an unstructured data element may comprise ranking NLP candidate classification labels and structured data candidate classification labels, determining one or more of: i) a synonymous word comprising a best distance measure that is greater than a best distance threshold, ii) a distance measure difference between a top-ranking synonymous word associated with the unstructured data element and a next top-ranking synonymous word associated with the unstructured data element being greater than a minimum distance threshold, and iii) a top-ranking synonymous word comprising a distance measure that is at least a given proportion (e.g., a percentage) higher than a distance measure of a next-top ranking synonymous word, and assigning to the unstructured data element an NLP candidate classification label associated based at least in part on the one or more determinations. The distance measure difference may comprise a difference between a distance measure of the top-ranking synonymous word and a distance measure of the next top-ranking synonymous word. If the distance measure difference is below the threshold, the top-ranking NLP candidate classification label may be confirmed with a top-ranking structured data candidate classification label via an ensemble machine learning model.

FIG. 6 depicts an exemplary common data model framework 600 according to one embodiment of the present disclosure. In particular, the common data model framework 600 depicted in FIG. 6 comprises a common data classification machine learning model implemented in conjunction with ensemble modeling (e.g., an ensemble machine learning model). As depicted, an NLP-based engine/ML-based engine pair is selected for a segment to be applied in a healthcare domain. The NLP-based engine may comprise an NLP machine learning model and the ML-based engine may comprise a structured data machine learning model, both trained according to a data domain standard and application-specific data and attributes associated with the selected application segment.

EMR notes (e.g., unstructured data) are provided to the NLP-based engine for generating prediction outputs. The EMR notes may comprise an unstructured data element "3-5 pints weekly" representative of drinking behavior data. The NLP-based engine may be trained to generate prediction outputs via NLP algorithmic processing of the unstructured data element in accordance with a data domain standard and application-specific data and attributes for the application segment. Prediction outputs generated by the NLP-based engine may comprise a plurality of NLP candidate classification labels along with their probability scores. A probability score generated by the NLP-based engine may comprise a quantitative value representative of a likelihood of an NLP candidate classification label being descriptive of an unstructured data element. The probability score may be generated based at least in part on a distance measure (e.g., semantic distance) between an unstructured data element and a synonymous word from a pre-defined vocabulary.

EMR standard fields are provided to the ML-based engine for generating prediction outputs. The EMR standard fields may comprise structured data for a "Recommendation" field including data values of "high intensity drug" and "liver issue." The ML-based engine may be trained to generate prediction outputs based at least in part on structured data associated with the unstructured data element provided to the NLP-based engine and in accordance with the data domain standard and the application-specific data and attributes of the application segment. Prediction outputs generated by the ML-based engine may comprise a plurality of structured data candidate classification labels along with their probability scores. A probability score generated by the ML-based engine may comprise a quantitative value representative of a likelihood that a structured data candidate classification label is descriptive of an unstructured data element.

An ensemble machine learning model may be used to resolve classification of the unstructured data element for each top-ranking NLP candidate classification label comprising a distance measure difference between a synonymous word associated with the top-ranking NLP candidate classification label and a next top-ranking synonymous word associated with the unstructured data element that is below a threshold. In some embodiments, an ensemble machine learning model describes parameters, hyperparameters, and/or defined operations of a machine learning model that is configured to generate prediction output comprising a classification of unstructured data elements based at least in part on a combination of prediction outputs from a plurality of machine learning models, such as the NLP-based engine and the ML-based engine.

Common data model framework 600 may classify an unstructured data element based at least in part on an ensemble machine learning model determining a top-ranking one of one or more structured data candidate classification labels matching a top-ranking one of one or more NLP candidate classification labels when the top-ranking NLP candidate classification label comprises a distance measure difference between a synonymous word associated with the top-ranking NLP candidate classification label and a next top-ranking synonymous word associated with the unstructured data element is below a threshold. For each instance the top-ranking one of the one or more structured data candidate classification labels does not match the top-ranking one of the one or more NLP candidate classification labels when the top-ranking synonymous word comprises a distance measure difference below the threshold, the ensemble machine learning model may determine aggregate probability scores of the one or more NLP candidate classification labels and the one or more structured data candidate classification labels, and the common data model framework may classify unstructured data elements based at least in part on the aggregate probability scores.

In some embodiments, an aggregate probability score describes a quantitative value representative of a likelihood of an NLP candidate classification label being descriptive of an unstructured data element based at least in part on two or more probability scores. Aggregate probability scores may be determined by an ensemble machine learning model and used to classify an unstructured data element. An aggregate probability score may comprise a voting mechanism between, for example, an NLP machine learning model and a structured data classification machine learning model. As such, an ensemble machine learning model may generate prediction outputs based at least in part on a combination of prediction outputs from an NLP machine learning model and a structured data classification machine learning model. Aggregate probability scores may be determined by performing an operation based at least in part on an NLP candidate probability distribution associated with the one or more NLP candidate classification labels and a structured data probability distribution associated with the one or more structured data candidate classification labels, where the operation may comprise summation, mean, or maximum. In one embodiment, an aggregate probability score may comprise a weighted sum of probability scores associated with one or more NLP candidate classification labels and one or more structured data candidate classification labels.

Returning to FIG. 4, at step/operation 410, the predictive data analysis computing entity 106 initiates the performance of one or more prediction-based actions based at least in part on the classification of the one or more unstructured data elements. In some embodiments, the classification input is unstructured data, the output is one or more classifications/labels for the unstructured data, and the performance of prediction-based actions are initiated based at least in part on the classifications/labels. In some embodiments, initiating performance of the one or more prediction-based actions includes displaying the classification of the one or more unstructured data elements using a prediction output user interface. The prediction output user interface may display a list of top classification labels for classification input data comprising unstructured data.

In some embodiments, initiating performance of the prediction-based actions include performing load balancing operations for a post-prediction system. For example, various embodiments of the present disclosure make important technical contributions to improving resource-usage efficiency of post-prediction systems by using combined predictions (e.g., from an NLP machine learning model and a structured data classification machine learning model) to set the number of allowed computing entities used by the noted post-prediction systems. For example, in some embodiments, a predictive data analysis computing entity determines D classifications for D unstructured data elements based at least in part on D unstructured data-wide embedded representations for the D unstructured data elements. Then, the count of unstructured data elements that are associated with an affirmative classification, along with a resource utilization ratio for each unstructured data element, can be used to predict a predicted number of computing entities needed to perform post-prediction processing operations (e.g., automated investigation operations) with respect to the D unstructured data elements. For example, in some embodiments, the number of computing entities needed to perform post-prediction processing operations (e.g., automated investigation operations) with respect to D unstructured data elements can be determined based at least in part on the output of the equation:

$$R = \text{ceil}\left(\sum\nolimits_{k}^{k=K} ur_k\right),$$

where R is me predicted number of computing entities needed to perform post-prediction processing operations with respect to the D unstructured data element, cello) is a ceiling function that returns the closest integer that is greater than or equal to the value provided as the input parameter of the ceiling function, k is an index variable that iterates over K unstructured data elements among the D unstructured data elements that are associated with affirmative classifications, and $ur_k$ is the estimated resource utilization ratio for a kth unstructured data element that may be determined based at least in part on a count of characters/tokens/words in the kth unstructured data element. In some embodiments, once R is generated, the predictive data analysis computing entity can use R to perform operational load balancing for a server system that is configured to perform post-prediction processing operations (e.g., automated investigation operations) with respect to D unstructured data elements. This may be done by allocating computing entities to the post-prediction processing operations if the number of currently-allocated computing entities is below R, and deallocating currently-allocated computing entities if the number of currently-allocated computing entities is above R.

FIG. 7 is a flowchart diagram of an example process 700 for generating one or more NLP candidate classification labels. Via the various steps/operations of the process 700, the predictive data analysis computing entity 106 can use an NLP machine learning model to generate NLP candidate classification labels for unstructured data elements.

The process 700 begins at step/operation 702 when the predictive data analysis computing entity 106 extracts one or more features from one or more unstructured data elements. In one embodiment, extracting one or more features from an unstructured data element may comprise selecting at least a portion of data, such as text, strings, or characters from the unstructured data element.

At step/operation 704, the predictive data analysis computing entity 106 generates one or more synonymous words associated with the one or more extracted features. The one or more extracted features may be compared with a predefined vocabulary of representative text associated with application-specific data and attributes. For example, an NLP machine learning model may be trained to match one or more synonymous words, from a predefined set of words associated with a particular domain (e.g., automotive, banking, commerce, educational, healthcare, marketing, sales, legal and non-profit institutions), with extracted features from an unstructured data element. Any one of document/sentence/word similarity measuring techniques may be used to generate the one or more synonymous words, such as word mover's distance, support vector machine, bag-of-words, term frequency-inverse document frequency, latent semantic analysis, linear discriminant analysis, mixed sample data augmentation, combinatory categorical grammar, and Naïve Bayes. In one embodiment, generating the one or more synonymous words may comprise generating embeddings for the one or more extracted features and determining a distance measure, such as semantic distance, between the embeddings of the one or more extracted features and embeddings of the one or more synonymous words. For example, word mover's distance may measure the semantic distance of two documents (the one or more extracted features and a selected one of the one or more synonymous words) using Word2vec embeddings. The semantic distance among documents may be defined by document representation, similarity metric, and a (sparse) flow matrix.

At step/operation 706, the predictive data analysis computing entity 106 each of the one or more synonymous words may be associated with one of a plurality of NLP candidate classification labels. Synonymous words may be mapped to NLP candidate classification labels according to a data domain standard. For example, a synonymous word may be associated with an NLP candidate classification label comprising a representative description of the synonymous word in the context of a data domain standard.

At step/operation 708, the predictive data analysis computing entity 106 generates, for each of the one or more synonymous words, one or more probability scores based at least in part on a distance measure associated with the synonymous word. In one embodiment, the distance measure may comprise the distance measure determined between the embeddings of the one or more extracted features and embeddings of the one or more synonymous words. A probability score may comprise a quantitative value representative of a likelihood of an NLP candidate classification label being descriptive of an unstructured data element. In one embodiment, probability scores, such as probability as per application (e.g., provider) segment, normalized distance probability, and weighted probability may be generated for each synonymous word. A probability per application segment may comprise a probability based at least in part on a distance measure (e.g., determined between embeddings of the one or more extracted features and embeddings of a synonymous word) adjusted for application-specific data and attributes. A normalized distance may comprise a probability based at least in part on a proportionated distance measure from a summed distance measure. A weighted probability may comprise a probability based at least in part on a combination (e.g., product) of distance measure, normalized distance, and the probability per application segment.

At step/operation 710, the predictive data analysis computing entity 106 generates an NLP prediction output based at least in part on the one or more probability scores. The prediction output may comprise selected ones of NLP candidate classification labels and probability scores (e.g., weighted probability) of the selected NLP candidate classification labels. For each unstructured data element, an NLP candidate classification label associated with a highest distance measure (or top-ranking) may be selected for the prediction output based at least in part on a distance measure of a synonymous word associated with the NLP candidate classification label associated with the highest distance measure being greater by at least a threshold than a distance measure of a synonymous word associated with an NLP candidate classification label associated with a next-highest distance measure. For each unstructured data element, if the distance measure of the synonymous word associated with the NLP candidate classification label having the highest distance measure is not greater by at least the threshold than the distance measure of the synonymous word associated with the NLP candidate classification label having a next-highest distance measure, all of the NLP candidate classification labels associated the unstructured data element may be selected for the prediction output.

In one embodiment, probability scores (e.g., weighted probability) of multiple ones of synonymous words associated with a common NLP candidate classification label may be combined in the prediction output. The prediction output generated by the NLP machine learning model may be used to classify unstructured data either directly (e.g., if difference measure difference between top-ranked and next top-rank is above a threshold) or indirectly (e.g., if difference measure difference between top-ranked and next top-rank is below a threshold) by an ensemble machine learning model. For example, For each instance the top-ranking one of the one or more structured data candidate classification labels does not match the top-ranking one of the one or more NLP candidate classification labels when the top-ranking synonymous word comprises a distance measure difference below the threshold, an ensemble machine learning model may determine one or more aggregate probability scores of the one or more NLP candidate classification labels and the one or more structured data candidate classification labels, and a common data model framework may classify unstructured data elements based at least in part on the one or more aggregate probability scores.

An operational example of prediction output generated by an NLP machine learning model is depicted in FIG. 8. As depicted in FIG. 8, classification data 802A and classification data 802B may be generated for each unstructured data element (e.g., "new verbatim"), "3-5 pints" and "3 pints." Each of classification data 802A and classification data 802B comprises synonymous words (historical verbatim & synonymous) generated for the unstructured data elements "3-5 pints" and "3 pints." Classification data 802A and classification data 802B further comprise NLP candidate classification labels (Domain), probability as per application segment (Prob as per Provider segment), distance measure, normalized distance probability (Distance normalize), and weighted probability (Weighted prob).

Prediction output 804 comprises for each unstructured data element, an NLP candidate classification label associated with a highest distance measure (if a distance measure of a synonymous word associated with the NLP candidate classification label associated with the highest distance measure being greater by at least a threshold than a distance measure of a synonymous word associated with an NLP candidate classification label associated with a next-highest distance measure), or all of NLP candidate classification labels associated the unstructured data element (if the distance measure of a synonymous word associated with a NLP candidate classification label having the highest distance measure is not greater by at least the threshold than the distance measure of a synonymous word associated with the NLP candidate classification label having a next-highest distance measure). As depicted in FIG. 8, classification data 802A associated with an unstructured data element, "3-5 pints," comprises a synonymous word "2 Mugs" having a distance measure (e.g., normalized distance) that is the highest distance measure but is not greater than, for example, a 5% threshold. As such, all of the NLP candidate classification labels and their corresponding weighted probabilities from classification data 802A is provided in prediction output 804. Probability scores (e.g., weighted probability) of synonymous words, "2-4 pints" and 2 Mugs" associated with a common NLP candidate classification label, "Moderate Drinker" are combined into a single probability score in the prediction output.

Classification data 802B associated with unstructured data element, "3 pints," comprises a synonymous word "2-4 pints" having a distance measure (e.g., normalized distance) that is the highest distance measure and is greater than the 5% threshold. The NLP candidate classification label, "Moderate Drinker" associated with the synonymous word "2-4 pints" and its weighted probability from classification data 802B is provided in prediction output 804, while the weighted probabilities of the remaining synonymous words in classification data 802B may be set to '0.'

FIG. 9 is a flowchart diagram of an example process 900 for generating one or more structured data candidate classification labels. Via the various steps/operations of the process 900, the predictive data analysis computing entity 106 can use a structured data machine learning model to generate structured data candidate classification labels for unstructured data elements.

The process 900 begins at step/operation 902 when the predictive data analysis computing entity 106 extracts one or more features from one or more unstructured data elements. In one embodiment, extracting one or more features from an unstructured data element may comprise selecting at least a portion of data, such as text, strings, or characters from the unstructured data element.

At step/operation 904, the predictive data analysis computing entity 106 retrieves one or more structured data records based at least in part on the one or more unstructured data elements. The one or more structured data records may comprise one or more instances of historical or current data related to or similar to the one or more unstructured data elements. For example, the one or more structured data records may be complementary to the unstructured data elements. In one exemplary embodiment used in a healthcare setting, an unstructured data element may comprise an EMR note for a patient and one or more structured data records may comprise treatment and diagnosis information data from billing systems, claims systems, or systems that generate standardized data, such as codes for diagnostics, lab results, and recommended treatment associated with the patient EMR note or EMR notes of other patients that are comparable to the patient EMR note. In one embodiment, the structured data records may comprise one or more data entries in standard data fields that may be used to generate features for a structured data machine learning model in accordance with data domain standard and application-specific data and attributes. The structured data may be retrieved by a structured data classification machine learning model and used as classification input data to generate structured data candidate classification labels.

At step/operation 906, the predictive data analysis computing entity 106 generates, for each of the one or more structured data records, one or more structured data candidate classification labels. The one or more structured data candidate classification labels may comprise one or more classification labels generated by a structured data classification machine learning model trained based at least in part on the one or more structured data records.

At step/operation 908, the predictive data analysis computing entity 106 generates, for each of the one or more structured data records, one or more prediction values associated with the one or more structured data candidate classification labels. A prediction value may comprise a quantitative value representative of a likelihood that a structured data candidate classification label is descriptive of an unstructured data element.

At step/operation 910, the predictive data analysis computing entity 106 generates one or more aggregated classification label predicted values based at least in part on the one or more prediction values. An aggregated classification label predicted value may comprise a combination of prediction values associated with the one or more structured data candidate classification labels aggregated over the one or more structured data records. As such, the aggregated classification label predicted value may be representative of a likelihood that a selected structured data candidate classification label is descriptive of an unstructured data element based at least in part on a combination of prediction values associated with the selected structured data candidate classification label (e.g., from each of the one or more structured data records).

At step/operation 912, the predictive data analysis computing entity 106 generates a structured data prediction output based at least in part on the one or more structured data candidate classification labels and the one or more aggregated classification label predicted values.

FIG. 10 depicts an operational example of a prediction output generated by a structured data classification machine learning model. As depicted in FIG. 10, classification data 1002 may be generated based at least in part on structured data associated with unstructured data elements for classification into standardized data. As depicted in FIG. 10, classification data 1002 may be generated for each unstructured data element (New Verbatim) from each structured data record (Member). A structured data classification label (Domain) and a predicted value comprising a quantitative value representative of a likelihood that the structured data candidate classification label is descriptive of the unstructured data element, is generated for each unstructured data element/structured data record combination.

The structured data classification labels and the predicted values from classification data 1002 may be combined and generated to prediction output 1004. Combining the structured data classification labels and the predicted values comprises generating aggregated classification label predicted values. The aggregated classification label predicted value may be representative of a likelihood that a selected structured data candidate classification label is descriptive of an unstructured data element based at least in part on a combination of prediction values from classification data 1002 associated with the selected structured data candidate classification label.

FIG. 11 depicts an operational example of a prediction output generated by an ensemble machine learning model. For each instance a top-ranking one of the one or more structured data candidate classification labels (e.g., "Heavy Drinker) does not match the top-ranking one of the one or more NLP candidate classification labels (e.g., Moderate Drinker) when the distance measure difference between the top-ranking synonymous word associated with the unstructured data element (2 Mugs) and the next top-ranking synonymous word associated with the unstructured data element (2-4 pints) is below a threshold, the ensemble machine learning model may determine one or more aggregate probability scores of the one or more NLP candidate classification labels and the one or more structured data candidate classification labels As depicted in FIG. 11, prediction output 1100 comprises aggregate probability scores of candidate classification labels for each unstructured data element based at least in part on prediction output 804 and prediction output 1004. As such, a combination of output from an NLP machine learning model and a structured data classification machine learning model may be used to classify each unstructured data element. In the illustrated example, the unstructured data element "3-5 Pints" may be assigned a classification label of "Heavy Drinker" and the unstructured data element "3 Pints" may be assigned a classification label of "Moderate Drinker" based at least in part on the prediction output 1100.

Accordingly, as described above, various embodiments of the present disclosure make important technical contributions to improving predictive accuracy of predictive machine learning models by combining prediction outputs of distinct machine learning models simultaneously applied towards classification of unstructured data, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. (Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time). Accordingly, techniques that improve predictive accuracy without harming training speed, such as the techniques described herein, enable improving training speed given a constant predictive accuracy. In doing so, the techniques described herein improving efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing data standardization on unstructured data, the computer-implemented method comprising:

for each of one or more unstructured data elements of classification input data, generating, by a computing entity and using a natural language processing (NLP) machine learning model, an NLP candidate classification label;

for each of the one or more unstructured data elements, generating, by the computing entity and using a structured data classification machine learning model, a structured data candidate classification label associated with the unstructured data element based at least in part on structured data;

classifying, by the computing entity and using a common data classification machine learning model, each of the one or more unstructured data elements based at least in part on each NLP candidate classification label and each structured data candidate classification label, wherein classifying each of the one or more unstructured data elements comprises:

(a) determining a distance measure difference between a top-ranking synonymous word associated with the unstructured data element and a next top-ranking synonymous word associated with the unstructured data element, (b) assigning a selected NLP candidate classification label to the unstructured data element based at least in part on the distance measure difference being above a threshold, and (c) using, based at least in part on the distance measure difference being below the threshold, an ensemble machine learning model to:

(i) determine a top-ranking structured data candidate classification label matching a top-ranking NLP candidate classification label associated with the top-ranking synonymous word, and (ii) for each instance of the top-ranking structured data candidate classification label that does not match the top-ranking NLP candidate classification label, generate an aggregate probability score based at least in part on the NLP candidate classification label and the structured data candidate classification label; and initiating, by the computing entity, the performance of one or more prediction-based actions based at least in part on the classification of the one or more unstructured data elements.

2. The computer-implemented method of claim 1, wherein (a) generating the aggregate probability score comprises an operation based at least in part on an NLP candidate probability distribution associated with the NLP candidate classification label and a structured data probability distribution associated with the structured data candidate classification label, and (b) the operation is one of a summation operation, a mean operation, or a maximum operation.

3. The computer-implemented method of claim 1, wherein the aggregate probability score comprises a weighted sum of probability scores associated with the NLP candidate classification label and the structured data candidate classification label.

4. The computer-implemented method of claim 1, wherein the NLP candidate classification label comprises one or more classification labels associated with a data domain standard.

5. The computer-implemented method of claim 1, wherein the NLP machine learning model is trained based at least in part on a pre-defined vocabulary of representative text associated with a data domain standard and application-specific data and attributes.

6. The computer-implemented method of claim 5, wherein generating the NLP candidate classification label comprises:
   for each of the one or more unstructured data elements, selecting a synonymous word from the pre-defined vocabulary; and
   generating the NLP candidate classification label based at least in part on the synonymous word.

7. The computer-implemented method of claim 6, wherein the NLP candidate classification label is ranked by determining a semantic distance between the one or more unstructured data elements and selected ones of representative text from the pre-defined vocabulary.

8. The computer-implemented method of claim 1, wherein the structured data classification machine learning model comprises a multi-class classification model trained based at least in part on a plurality of classification labels associated with a data domain standard.

9. The computer-implemented method of claim 1, wherein the NLP machine learning model is at least one of a word mover's distance classification model, a support vector machine classification model, a bag-of-words classification model, a term frequency-inverse document frequency classification model, a latent semantic analysis classification model, a linear discriminant analysis classification model, a mixed sample data augmentation classification model, a combinatory categorical grammar classification model, or a Naïve Bayes classification model.

10. An apparatus for performing data standardization on unstructured data, the apparatus comprising at least one processor and at least one memory including program code, the at least one memory and the program code configured to, with the processor, cause the apparatus to at least:
   for each of one or more unstructured data elements of classification input data, generate, using a natural language processing (NLP) machine learning model, an NLP candidate classification label;
   for each of the one or more unstructured data elements, generate, using a structured data classification machine learning model, a structured data candidate classification label associated with the unstructured data element based at least in part on structured data;
   classify, using a common data classification machine learning model, each of the one or more unstructured data elements based at least in part on each NLP candidate classification label and each structured data candidate classification label, wherein classifying each of the one or more unstructured data elements comprises:
      (a) determining a distance measure difference between a top-ranking synonymous word associated with the unstructured data element and a next top-ranking synonymous word associated with the unstructured data element,
      (b) assigning a selected NLP candidate classification label to the unstructured data element based at least in part on the distance measure difference being above a threshold, and
      (c) using, based at least in part on the distance measure difference being below the threshold, an ensemble machine learning model to:
         (i) determine a top-ranking structured data candidate classification label matching a top-ranking NLP candidate classification label associated with the top-ranking synonymous word, and
         (ii) for each instance of the top-ranking structured data candidate classification label that does not match the top-ranking NLP candidate classification label, generate an aggregate probability score based at least in part on the NLP candidate classification label and the structured data candidate classification label; and
   initiate the performance of one or more prediction-based actions based at least in part on the classification of the one or more unstructured data elements.

11. The apparatus of claim 10, wherein (a) generating the aggregate probability score comprises an operation based at least in part on an NLP candidate probability distribution associated with the NLP candidate classification label and a structured data probability distribution associated with the structured data candidate classification label, and (b) the operation is one of a summation operation, a mean operation, or a maximum operation.

12. The apparatus of claim 10, wherein the aggregate probability score comprises a weighted sum of probability scores associated with the NLP candidate classification label and the structured data candidate classification label.

13. The apparatus of claim 10, wherein the NLP candidate classification label comprises one or more classification labels associated with a data domain standard.

14. The apparatus of claim 10, wherein the NLP machine learning model is trained based at least in part on a pre-defined vocabulary of representative text associated with a data domain standard and application-specific data and attributes.

15. The apparatus of claim 14, wherein generating the NLP candidate classification label comprises:
   for each of the one or more unstructured data elements, selecting a synonymous word from the pre-defined vocabulary; and
   generating the NLP candidate classification label based at least in part on the synonymous word.

16. The apparatus of claim 15, wherein the NLP candidate classification label is ranked by determining a semantic distance between the one or more unstructured data elements and selected ones of representative text from the pre-defined vocabulary.

17. The apparatus of claim 10, wherein the structured data classification machine learning model comprises a multi-class classification model trained based at least in part on a plurality of classification labels associated with a data domain standard.

18. The apparatus of claim 10, wherein the NLP machine learning model is at least one of a word mover's distance classification model, a support vector machine classification model, a bag-of-words classification model, a term frequency-inverse document frequency classification model, a latent semantic analysis classification model, a linear discriminant analysis classification model, a mixed sample data augmentation classification model, a combinatory categorical grammar classification model, or a Naïve Bayes classification model.

19. A computer program product for performing data standardization on unstructured data, the computer program product comprising at least one non-transitory computer-readable storage medium having computer-readable program code portions stored therein, the computer-readable program code portions configured to:
  for each of one or more unstructured data elements of classification input data, generate, using a natural language processing (NLP) machine learning model, an NLP candidate classification label;
  for each of the one or more unstructured data elements, generate, using a structured data classification machine learning model, a structured data candidate classification label associated with the unstructured data element based at least in part on structured data;
  classify, using a common data classification machine learning model, each of the one or more unstructured data elements based at least in part on each NLP candidate classification label and each structured data candidate classification label, wherein classifying each of the one or more unstructured data elements comprises:
    (a) determining a distance measure difference between a top-ranking synonymous word associated with the unstructured data element and a next top-ranking synonymous word associated with the unstructured data element,
    (b) assigning a selected NLP candidate classification label to the unstructured data element based at least in part on the distance measure difference being above a threshold, and
    (c) using, based at least in part on the distance measure difference being below the threshold, an ensemble machine learning model to:
      (i) determine a top-ranking structured data candidate classification label matching a top-ranking NLP candidate classification label associated with the top-ranking synonymous word, and
      (ii) for each instance of the top-ranking structured data candidate classification label that does not match the top-ranking NLP candidate classification label, generate an aggregate probability score based at least in part on the NLP candidate classification label and the structured data candidate classification label; and
  initiate the performance of one or more prediction-based actions based at least in part on the classification of the one or more unstructured data elements.

20. The computer program product of claim 19, wherein (a) generating the aggregate probability score comprises an operation based at least in part on an NLP candidate probability distribution associated with the NLP candidate classification label and a structured data probability distribution associated with the structured data candidate classification label, and (b) the operation is one of a summation operation, a mean operation, or a maximum operation.

* * * * *